March 31, 1970     L. J. ILINES     3,503,342
APPARATUS FOR MIXING AND EXTRUDING POTATO DOUGH
Filed Dec. 26, 1967     2 Sheets-Sheet 1
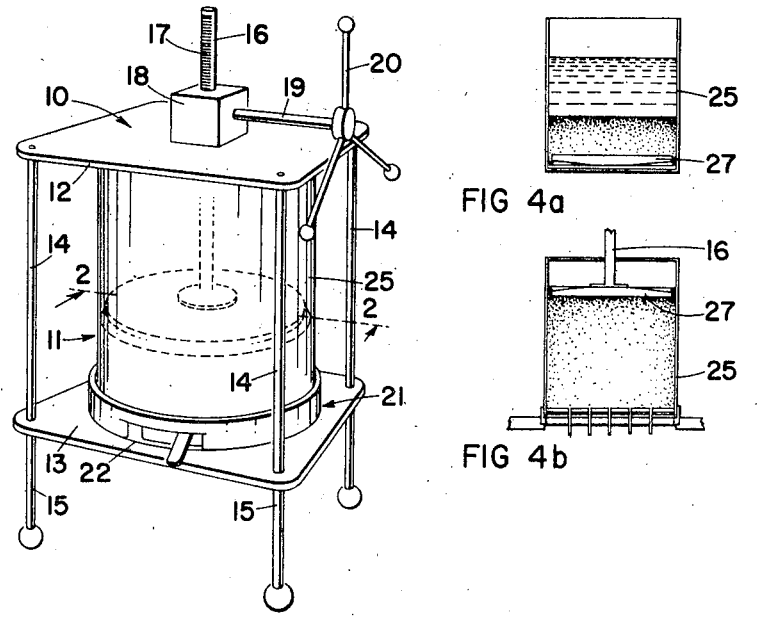
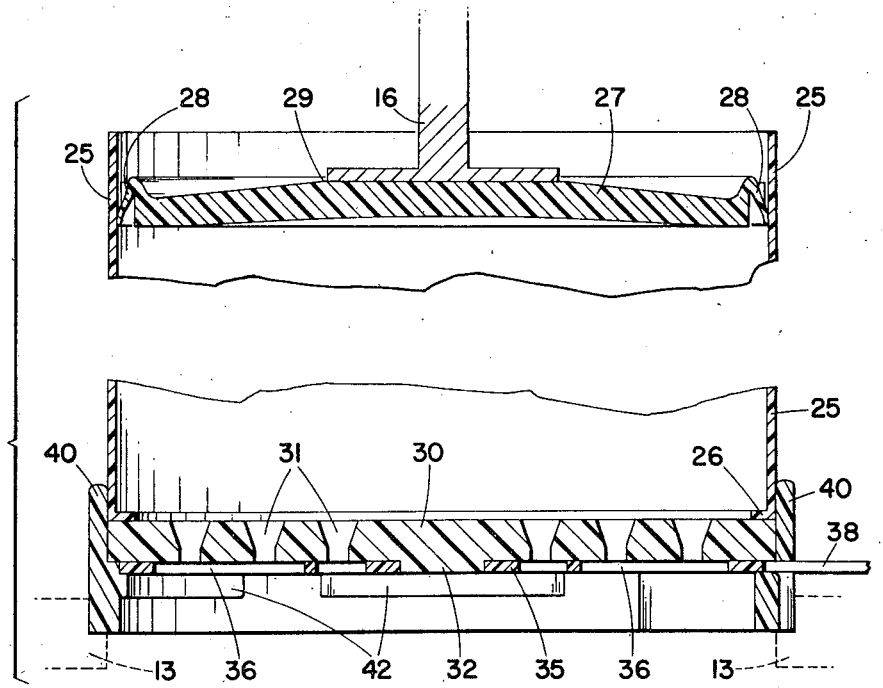
INVENTOR:
LAURENCE J. ILINES
BY: *George A. Rolston*

March 31, 1970   L. J. ILINES   3,503,342
APPARATUS FOR MIXING AND EXTRUDING POTATO DOUGH
Filed Dec. 26, 1967   2 Sheets-Sheet 2
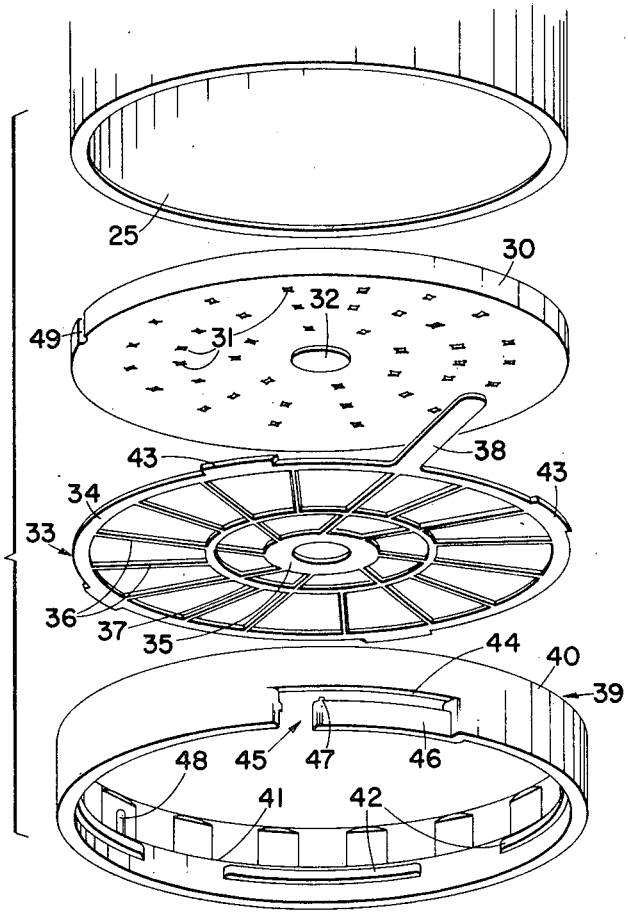
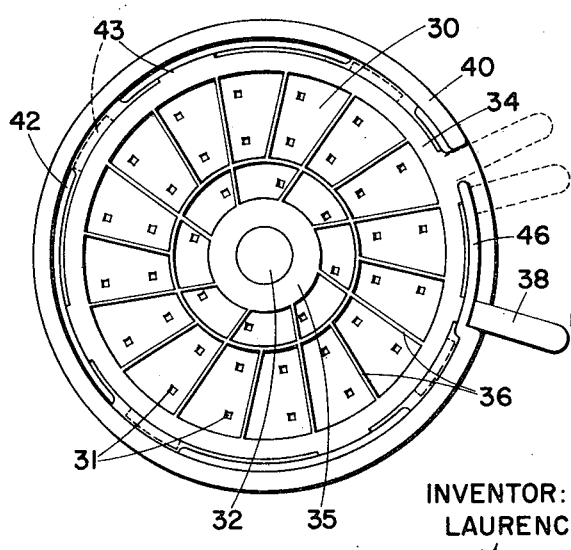
INVENTOR:
LAURENCE J. ILINES
BY: *George A. Rolston*

United States Patent Office 3,503,342
Patented Mar. 31, 1970

3,503,342
APPARATUS FOR MIXING AND EXTRUDING
POTATO DOUGH
Laurence James Ilines, 7 Feldbar Court,
Willowdale, Ontario, Canada
Filed Dec. 26, 1967, Ser. No. 693,474
Int. Cl. A21c *11/16*
U.S. Cl. 107—14    6 Claims

ABSTRACT OF THE DISCLOSURE

This specification discloses apparatus for the mixing of potato dough and for subsequently extruding the potato dough from the same apparatus, when such apparatus is placed in any suitable extrusion press, the apparatus including a cylinder and pressure plate which is used both as a mixing vessel and also as the extrusion cylinder, and further including a die member and cutter assembly which is removably detachable from one end of the cylinder member so that, after mixing of the potato dough in a first operation, the apparatus may then be assembled and inverted and placed in the extrusion press ready for extrusion of potato chips, thereby reducing the number of operations required each time a batch is mixed, and also simplifying the cleaning and servicing of the parts.

---

This invention relates to apparatus for mixing potato flour into dough and subsequently extruding the same in strip form for cooking.

In my U.S. Letters Patent No. 3,344,752 issued Oct. 3, 1967, for Potato Dough Extruder, there is described an apparatus for extruding potato dough, which apparatus may also be used, if desired, for the mixing of the potato dough itself. This apparatus however, while being an efficient means of extruding the potato dough in strip form, was relatively costly to manufacture and incorporated certain refinements which were found to be superfluous. This type of apparatus is employed in connection with the preparation of potato dough, which is formed from potato flour and water mixed to a predetermined consistency, the apparatus incorporating an extrusion die through which the dough is forced, various suitable extrusion apertures being provided in different such dies depending upon the shape of extrusion desired. A circular drum or cylinder is provided for holding the potato dough, and a plunger operated by means of a rack and pinion, or other suitable power operated means such as a hydraulic or electrical device, forces the dough through the extrusion apertures. Preferably, a cutoff mechanism is provided adjacent the lower side of the extrusion die for cutting off the extruded length of dough. The extruded dough is then ready for deep frying in conventional cooking apparatus.

As stated, the apparatus described in my aforesaid Letters Patent was found to be relatively costly to manufacture, especially, the construction of the cylinder of transparent acrylic plastic and the provision of a stainless steel plunger and stainless steel cutoff mechanism, and the provision of a complex gear box incorporating a large number of machine parts, all added unnecessarily to the cost of the apparatus.

In addition, the mixing of the potato flour and water into the dough or paste which is normally done just before extrusion from the apparatus, is a messy and wasteful operation since the mixed dough is a gummy substance which is relatively difficult to handle, and substantial quantities are retained in the mixing vessel. Under certain circumstances, it was possible to mix the potato flour and water in the cylinder of the extrusion mechanism itself, in my aforesaid apparatus, but this was a relatively inconvenient operation, and, in addition, the design of the plunger or pressure plate did not provide an adequate seal so that quantities of dough were found to be left within the cylinder and had to be thrown away, before the next batch of dough and water were mixed. This problem is especially aggravating bearing in mind that this type of apparatus is used by almost totally unskilled labour or in many cases, casual summer help in so called "drive-in" restaurants and the like and as a result, the full economy of cooking with potato dough rather than fresh potatoes were never realized.

In addition, it is considered desirable by restaurant owners, to have a single apparatus capable with only minor changes, of producing either regular sized chipped potatoes, or shoe-string potatoes, and various other shapes and varities. When using such extruding apparatus, all that is required to produce a different shape of extrusion is to change the die. However, in my aforesaid apparatus, the dies themselves were relatively expensive, and the restaurant owners were reluctant to buy the various different dies required. As a result, they did not always obtain maximum use of the extrusion apparatus and thereby failed to realize the maximum advantage therefrom.

In addition, my aforesaid apparatus incorporated a relatively large number of parts requiring a lengthy cleaning operation at the end of each day's use.

In some cases, restaurant owners may wish to offer to their patrons potato chips formed in various colours and in various different shapes, without the need for pre-cooking portions of all of the different kinds, the order for any particular colour or shape being immediately extruded and cooked thereby saving the substantial wastage which would occur if the restaurant were obliged to maintain a stock of chips in all the different shapes and colours. Obviously, if a number of such extrusion machines were operated simultaneously then this result could readily be achieved. However, the considerable expense of my prior machine rendered this economic only in very large restaurants, and thereby tended to limit the potential sales.

It is therefore an objective of the present invention to provide a potato dough extruding apparatus in which the extrusion cylinder and die and cutoff means are of greatly simplified design and are particularly suitable for forming by injection moulding of the thermoplastic material, and in which the cylinder itself may also be used as a vessel for mixing the flour and water into dough without the addition of any other parts or sealing means.

More particularly, it is an objective of the present invention to provide a potato dough extrusion apparatus having the foregoing advantages in which the pressure plate incorporates liquid tight sealing means providing a liquid tight closure for one end of the cylinder thereby forming the same into a mixing vessel.

More particularly, it is an objective of the present invention to provide a potato dough extrusion apparatus having the foregoing advantages in which the extrusion die and cutoff means may be attached to one end of the cylinder without the need of any special seals or clamping means thereby permitting the same to be handled as a single assembly for insertion into and removal from any suitable extrusion press.

More particularly, it is an objective of the present invention to provide a potato dough extrusion apparatus in which the extrusion cylinder, pressure plate, die and cutoff means may be made and sold at such a price that restaurant owners having only one extrusion press, may be enabled to purchase several such extrusion cylinder units so as to maintain instantly available supplies of potato chips in different colours and in different shapes, without the need for maintaining stocks of cooked chips in such different colours and shapes.

The foregoing and other advantages will become apparent from the following description of a preferred embodiment of the invention which is given here by way of example only with reference to the following drawings in which like reference devices refer to like parts thereof throughout the various views and diagrams and in which;

FIGURE 1 is a perspective illustration showing a potato dough extrusion press, and a potato dough extrusion cylinder unit inserted in position in the press ready for use;

FIGURE 2 is a sectional side elevation along the line 2—2 of FIGURE 1 showing the upper and lower halves of the extrusion cylinder and the pressure plate therein;

FIGURE 3 is an exploded lower perspective illustration showing part of the extrusion cylinder and the extrusion die and chip cutoff means;

FIGURES 4a and 4b are schematic illustrations showing stages in the use of the extrusion cylinder unit illustrated in FIGURES 1, 2 and 3, FIGURE 4a showing the premixing stage, and FIGURE 4b showing the extrusion cylinder ready for use for the production of strip potatoes; and FIGURE 5 is a lower plan view of the extrusion cylinder, die and cutoff means, showing in phantom the various positions of the cutoff means.

Referring now to FIGURE 1 it will be noted that the apparatus illustrated consists essentially of two main portions, namely, the extrusion press indicated generally as 10 and the extrusion chamber indicated as 11. It is to be understood that, for the purposes of the invention, the extrusion press 10 may be any one of a variety of designs and may be operated either manually, electrically, hydraulically or by any other suitable means, the particular press 10 shown, however, being of a particularly efficient and economical design rendering it suitable for use in conjunction with the cylinder 11 according to the invention.

Thus the press 10 will be seen to comprise upper and lower plates 12 and 13, preferably of equal size and shape and being somewhat wider in the front than in the rear. Plates 12 and 13 are held together by four spacer rods 14 bolted to the four corners of plates 12 and 13. Any suitable support means such as legs 15, attached to lower plate 13, are provided for locating the press 10 in any suitable working position. It will be understood however that other support means attached either to plate 13 or to plate 12, or to both of them or in any other way may be provided so as to permit the mounting of press 10, for example, on a swingable wall mounting (not shown) or on a mounting adapted for fastening directly over a chip fryer (not shown).

In order to apply downward pressure, a pressure shaft 16 passes slidably through upper plate 12, and is moved up and down by means of the toothed racking 17 formed along one side thereof driven by any suitable pinion drive (not shown) contained within housing 18. Drive shaft 19 is connected to such pinion drive, and is provided with operating handles 20 for rotation thereof in either direction thereby causing shaft 16 to move either downwardly or upwardly as desired. Preferably, the ratio between the rack and pinion gearing, and the other frictional factors incorporated in such drive means, are such that the pressure shaft 16 will remain in whatever position it is set by means of handles 20 without sliding downwardly, such a predetermined amount of friction facilitating the operation of the device, and leaving both hands of the operator free for manipulation of the pressure cylinder 11.

Lower plate 13 is provided with a circular opening indicated generally as 21 preferably slightly larger than the lower periphery of pressure cylinder 11, which opening 21 is preferably surrounded by a retaining lip 22 for locating cylinder 11 predetermined central location with respect to plate 13 and preventing the same from sliding thereon.

Pressure cylinder unit 11 comprises five separate members all of which are preferably moulded by injection moulding of thermoplastic material, the particular material from which the same are moulded being adapted to withstand substantial pressures which may be developed in use and also being capable of being subjected to relatively high temperatures for washing purposes and the like, while obviously being campatible with the particular food substances, namely, potato dough, being handled without contaminating the same. Without limiting the choice of such material, it has been found that acrylonitrile-butadiene-styrene plastics are particularly suitable for the purpose. The extrusion cylinder unit 11 consists essentially of a cylindrical member 25 having preferably at one end thereof an inturned lip 26, the other end thereof preferably being open and free from obstruction. A pressure plate member 27 is formed having an outer peripheral sealing skirt portion 28 extending therearound and preferably biased outwardly so as to make spring contact with the inner surfaces of cylinder 25. The central portion of plate 27 is preferably of generally saucer shaped construction whereby to provide an even distribution of pressure, and to provide the maximum resistance to operational stresses the central portion 27 is preferably provided with an upper flattened central boss 29 for contacting by the lower flattened end of pressure shaft 16.

With particular reference to FIGURE 3 the extrusion die member 30 will be seen to comprise an integral thermoplastic member of relatively massive construction in the form of a relatively thick disc having a series of extrusion openings 31 formed therethrough, and a central boss member 32. The extrusion openings 31 are preferably formed in accordance with the invention described in my co-pending U.S. application Ser. No. 625,231. It will be understood that in the majority of cases it is considered desirable to provide strips of potato dough which as nearly as possible correspond to the shape and dimensions of a conventional French fried potato. In order to do this, according to my aforesaid invention, it is found to be preferable to provide extrusion die openings 31 with a cross section in which the four sides of the extrusion die are all provided with a more or less convex profile whereby the strip of extruded dough is formed into a generally square shape in which the four sides of the square are somewhat indented, such four sides expanding after extrusion to adopt an almost perfectly square shape.

It will be understood however that the extrusion die member 30 may be provided with a wide variety of different openings 31 whereby to produce strips of potato having a triangular section or a very much reduced square cross section or almost any other variety dependent only upon the taste of the public themselves.

The cutoff means comprises the cutoff wheel member 33 having an outer rim 34 a central hub member 35, and intermediate cutter blade members 36 arranged somewhat in the manner of the spokes of a wheel, the blade members 36 being arranged so that they are not precisely radial with respect to the geometric centre of the wheel 33, but extend from point on hub 35 to point on rim 34, which points are not precisely aligned along such radial axes but follow a predetermined pattern so as to fit within the extrusion opening 31 in die member 30. For additional strength, an intermediate ring member 37 is preferably added, to ensure that blade 36 remains perfectly flat and lies closely adjacent to the underside of die member 30. Hub member 35 is provided with an interior opening dimension corresponding closely to the size of boss member 32, thereby providing a central bearing around with the wheel 33 may be rotated. An operating handle 38 extends from the outer edge of rim 34.

Die member 30 and wheel 33 are held in juxta position relative to one another and in fixed relation to cylinder 25 by means of retaining ring 39. Ring 39 comprises an outer wall portion 40, preferably provided around its interior surface with a series of flat surfaces defining a polygonal outline, dimensioned to make a good press tight fit with the end of cylinder 25. Around the lower edge of member 39 there is involved a ledge or ring 41 extending around the inner surface of wall member 40 and adapted to make sealing engagement with the lower edge of die member 30. Spaced in a plane below that of stepped ring 41 are provided a plurality of arcuate lip or flange members 42 separated from one another by predetermined spacing around the inner circumference of stepped ledge 41. Lugs or bearings 43 are arranged around the periphery of rim 34 of wheel 33, being equal in number to the spaces between lips 42, and being of somewhat less size thereby permitting lugs 43 to be inserted within such spaces, somewhat in the manner of the breach of a heavy gun. A slotted opening 44 is provided through wall 40 to accommodate handle 38 of wheel 33 therethrough. Handle 38 may be simply inserted through slot 44, or alternatively may be introduced upwardly through gateway 45 making communication with slot 44. Handle 38 is retained in position by means of the inwardly offset tongue 46 provided with a stop member 47 at the free end thereof, handle 38 being sufficiently flexible to be deflected upwardly to pass over stop member 47 when it is desired to remove the same from retaining ring 39.

In order to register die member 30 in a predetermined location with reference to ring member 39 and with reference to cutoff wheel 33, an abutment member 48 is provided on the inner side of wall 40, making mating engagement with a complementary notch 49 formed in the edge of die member 30.

In operation, the first step is to mix the potato flour and water into potato dough. This mixing step may preferably be performed according to the invention, in the cylinder member 25. For this purpose, the cylinder member 25 and with the pressure plate member 27 inserted therein in a reverse direction from one end of cylinder member 25 and pushed downwardly therealong toward the opposite end. Preferably the plate member 27 is inserted through the end of cylinder 25 defined by lip 26 and is pushed downwardly toward the opposite end thereof, care being taken that plate 27 is not pushed completely through cylinder 25 since there is no restriction at that point. Once they are assembled, the cylinder member 25 and the pressure plate member 27 together forms a liquid tight vessel, and markings (not shown) may be formed along the interior of cylindrical member 25 to assist in the measuring of the quantities of the materials to be poured therein. The potato dough is then poured into the cylinder member 25 in the predetermined quantity for the particular batch being made, and the necessary quantity of water is added. This stage of the operation is illustrated in FIGURE 4a in a schematic manner. After thorough mixing of the ingredients to form a smooth dough or paste, the remaining members are assembled, preferably by inserting die member 30 into retaining ring 39 with abutment member 48 seating in notch 49 thereby to locate die member 30 with respect to retaining ring 39, and retaining ring 39 is then pressed over the open end of cylinder member 25. Obviously, alternatively, the retaining ring 39, and die member 30 therein may be laid flat on a counter top and the cylinder member 25 may be inverted and forced downwardly into retaining ring 39. The cutter wheel 33 may then be introduced by lining up lugs 43 on wheel 33 with the spaces between lips 42, and simultaneously lining up handle 38 with gateway 45. When these members are all lined up, the wheel 33 will then drop into position, and a rotation of a few degrees, by means of handle 38, will cause lugs 43 to interengage with lips 42 thereby retaining wheel 33 in position. Such semi-rotary movement will also force handle 38 to be deflected by stop member 47 on tongue 46 and enter slot 44. It will be appreciated that the arcuate distance defined by slot 44 defines the limit of movement of handle 38 and thus of wheel 33. It will further be understood, that the limit so defined must necessarily correspond to two positions of wheel 33, relative to the opening 31 in die member 30, in either of which position the openings 31 are free of obstruction by cutter blades 36, since otherwise, blades 36 would interfere with the dough being extruded from openings 31. Obviously, if the pattern of holes 31, and the construction of blades 36 made it possible for only one such position of complete lack of interference to be achieved, then some such expedient as a return spring means (not shown) might be added to cutter wheel 33 to return the same to a predetermined clear position. However, in the presently preferred embodiment, such an arrangement has not been found to be necessary but it is obviously deemed to be included within the scope of the invention. Similarly, if desired, linkage means could be arranged for the operation of handle 38 in cyclical sequence with the operation of operating handle 20, somewhat in the manner illustrated in my aforesaid prior application, although, such a linkage means is found to add unnecessarily to the cost of the equipment, without producing any commensurate benefit.

The final step involves the inverting of cylinder 25 so as to place the same upright with the open end thereof, and pressure plate 27, being uppermost, and the retaining ring 39 and die member 30 being lower most. The entire pressure cylinder unit indicated as 11 is then inserted into the press 10 and located in position on retaining lip 22. Operating handles 20 are then rotated until pressure shaft 16 engages boss means 29 on pressure plate 27, and continued operation of operating handles 20 will force pressure plate 27 downwardly through cylinder member 25, pushing the potato dough contained therein toward die member 30. As soon as such potato dough is compressed against die member 30, extrusion of potato chips by operation of predetermined increments of operating handles 20 may commence.

It should be noted that die member 30 is held in engagement with cylinder 25 only by frictional grip. It is found that this is sufficient for the purpose, lip 26 on cylinder 25 being effective to prevent any escape of potato dough between cylinder 25 and die 30, due to the somewhat unequal development of extrusion flow through the dough which behaves totally unlike a liquid or gas in which the pressure is equal at all points. In many cases, in fact, it is found that the lip 26 on cylinder 25 can be dispensed with, or that cylinder 25 can be used the opposite way up, lip 26 merely serving to retain plate 27 therein during mixing.

However if desired, a simple form of positive locking could be arranged, such as two or more spaced lugs (not shown) on the exterior of cylinder 25, and corresponding angled grooves in the interior of ring 39 (not shown). As stated above, such locking means is generally unnecessary since the flats arranged around the inner surface of wall 40 of ring 39 are dimensioned to make a snug, jamming fit with cylinder 25 and so long as die 30 is maintained in contact with cylinder 25, or lip 26 thereof, there is little or no tendency for it to become unseated.

It will be understood that while the design of the press 10 may be varied widely, the operation of handles 20 (if it is a manual press) should preferably be towards the front of the machine. Thus if a direct rack and pinion drive, i.e. without intervening gearing, is employed, the racking 17 will be on the opposite side of shaft 16, from that shown in FIGURE 1.

It will be understood that according to a further embodiment of the invention such incremental movement of handles 20 may require the use of some form of rachet or escapement mechanism (not shown) such as that illustrated in my aforesaid prior application, in order to achieve regular extrusion of equal lengths of dough.

The foregoing is a description of a preferred embodiment of the invention which is given here by way of ex-

What I claim is:

1. Potato dough mixing and extrusion apparatus for use in association with extrusion press means adapted to apply extrusion pressure to said apparatus for extrusion of strips of potato dough therefrom, said apparatus comprising:

a pressure cylinder member open at least in part at both ends;

a pressure plate member incorporating sealing means adapted to make sliding sealing engagement with the interior of said pressure cylinder member;

an extrusion die member having extrusion openings therethrough, dimensioned to close off and seal with one end of said cylinder member;

retaining means adapted to extend between said die member and said cylinder member at least and retain the same in engagement as aforesaid so as to enable handling of said cylinder member and said extrusion die member at least as a single unit apart from said extrusion press means;

flange means arranged around a generally circular path on said die member retaining means, lying immediately below the lower surface of said die member when the same is assembled in position with its upper surface against the adjacent open end of said cylinder member;

generally circular cutter wheel means adapted to be located in closely adjacent relation to said extrusion die means, and movable relative to said extrusion openings therein, in a plane parallel to but spaced from the plane of said die member for movement along a predetermined path, said path including at least one position at which said extrusion openings are completely clear of obstruction;

a plurality of blade means on said cutter wheel means spaced apart from one another and extending inwardly towards a centrally located region of said cutter wheel means, bearing means on the periphery of said wheel means for interengaging with said flange means to retain the same in position against said die member; and handle means connected to said wheel means for operating the same.

2. The apparatus as claimed in claim 1 wherein said pressure plate member of generally saucer-shaped construction has an upper and a lower side, boss means on said upper side of said pressure plate member and sealing lip means around the periphery of said pressure plate member, said sealing lip means being biased to extend progressively outwardly from said pressure plate member from said upper side to said lower side thereof.

3. The apparatus as claimed in claim 1 including inturned lip means formed on one end of said cylinder means, and having a flat outwardly directed surface for seating on the periphery of said die means.

4. The apparatus as claimed in claim 1 including retaining wall means surrounding said cutter wheel means and incorporating guide members thereon permitting the same to move on a semi-rotary path relative to said die member, a slotted opening in said wall means, said handle means adapted to extend through said slotted opening, and a gateway formed in said wall means in communication with said slotted opening for introducing said handle into said slotted opening.

5. Apparatus as claimed in claim 1 including extrusion press means having a base plate, a circular opening formed in said base plate of a size corresponding to approximately the diameter of said cylinder member, and means for applying pressure within said cylinder member substantially along a vertical axis intersecting the plane of said base plate at right angle, and oriented with the centre of said circular opening therein.

6. Apparatus as claimed in claim 1 including extrusion press means having a base plate, a circular opening formed in said base plate of a diameter approximately corresponding to the diameter of said cylinder member pressure shaft means slidably supported vertically above said base plate for motion on a predetermined path normal to the plane of said base plate, means supporting said pressure member for sliding as aforesaid, and manual drive means connected to said pressure member for causing downward and upward movement thereof.

References Cited

UNITED STATES PATENTS

| | | |
|---|---|---|
| 1,172,400 | 2/1916 | Specht et al. |
| 1,487,378 | 3/1924 | Gigliotti. |
| 1,592,769 | 7/1926 | Imparato. |
| 1,736,611 | 11/1929 | Lubrano. |
| 1,955,342 | 4/1934 | Pizinni et al. |
| 2,070,206 | 2/1937 | Hudson _____ 401—172 X |
| 2,351,493 | 6/1944 | Curry. |

EDWARD L. ROBERTS, Primary Examiner

U.S. Cl. X.R.

18—12; 72—254